(12) United States Patent
Mire et al.

(10) Patent No.: US 10,987,845 B2
(45) Date of Patent: Apr. 27, 2021

(54) MULTI-MATERIAL EXTRUDER AND EXTRUSION METHOD FOR THREE-DIMENSIONAL (3D) PRINTING

(71) Applicant: STRUCTUR3D PRINTING INCORPORATED, Waterloo (CA)

(72) Inventors: Charles Mire, Waterloo (CA); Andrew Finkle, Belleville (CA); Marc Castel, Mono (CA)

(73) Assignee: STRUCTUR3D PRINTING INCORPORATED, Waterloo (CA)

( * ) Notice: Subject to any disclaimer, the term of this patent is extended or adjusted under 35 U.S.C. 154(b) by 254 days.

(21) Appl. No.: 15/118,329

(22) PCT Filed: Feb. 11, 2015

(86) PCT No.: PCT/CA2015/000080
§ 371 (c)(1),
(2) Date: Aug. 11, 2016

(87) PCT Pub. No.: WO2015/120538
PCT Pub. Date: Aug. 20, 2015

(65) Prior Publication Data
US 2017/0190118 A1 Jul. 6, 2017

Related U.S. Application Data

(60) Provisional application No. 61/938,468, filed on Feb. 11, 2014, provisional application No. 61/990,289, (Continued)

(51) Int. Cl.
*B29C 48/02* (2019.01)
*B29C 64/106* (2017.01)
(Continued)

(52) U.S. Cl.
CPC ............ *B29C 48/02* (2019.02); *B29C 48/266* (2019.02); *B29C 48/475* (2019.02); *B29C 48/92* (2019.02);
(Continued)

(58) Field of Classification Search
CPC ....... B29C 64/20; B29C 64/209; B29C 64/25; B29C 64/205; B29C 64/232;
(Continued)

(56) References Cited

U.S. PATENT DOCUMENTS 4,323,340 A * 4/1982 Uhlig .................. B29C 48/0011
425/325
4,362,496 A * 12/1982 Uhlig ..................... B29C 48/32
425/379.1
(Continued)

FOREIGN PATENT DOCUMENTS

EP 1886793 A1 * 2/2008 ........... B29C 64/112
FR 3002179 A1 * 8/2014 ......... B29C 67/0055

OTHER PUBLICATIONS

Gardan, Julien; English Translation for FR 3 002 179; Feb. 20, 2013 (Year: 2013).*

*Primary Examiner* — Seyed Masoud Malekzadeh
(74) *Attorney, Agent, or Firm* — Bhole IP Law; Anil Bhole; Marc Lampert

(57) ABSTRACT

There is disclosed a multi-material extruder and extrusion method for 3D printing, and more particularly to an apparatus and method that is adapted to extrude a wide range of materials for printing 3D structures. In an aspect, the apparatus comprises a frame adapted to receive a removable syringe or cartridge with a depressible piston in an extended position, the syringe or cartridge containing material to be extruded. An extrusion motor is under the control of an extruder logic module to determine how quickly the piston of the syringe or cartridge is to be depressed to achieve a
(Continued)

desired rate of extrusion of the material. A flexible length of tubing connects the tip of the syringe or cartridge to an extruder nozzle, which nozzle is mounted to a stylus which may be hand-held or mounted to a chassis of a 3D printing device. A feedback signal is used to provide a feedback signal to the extruder logic module to determine the rate of extrusion of material. The syringe or cartridge may include a label containing information on the type of material in the syringe or cartridge, and one or more extrusion parameters to be used with the material in the syringe or cartridge.

18 Claims, 7 Drawing Sheets

Related U.S. Application Data filed on May 8, 2014, provisional application No. 62/038,130, filed on Aug. 15, 2014.

(51) Int. Cl.
| | | |
|---|---|---|
| B29C 48/92 | (2019.01) | |
| B29C 48/475 | (2019.01) | |
| B29C 48/25 | (2019.01) | |
| B29C 64/209 | (2017.01) | |
| B33Y 10/00 | (2015.01) | |
| B33Y 30/00 | (2015.01) | |
| B33Y 50/02 | (2015.01) | |

(52) U.S. Cl.
CPC .......... *B29C 64/106* (2017.08); *B29C 64/209* (2017.08); *B33Y 10/00* (2014.12); *B33Y 30/00* (2014.12); *B33Y 50/02* (2014.12); *B29C 2948/92019* (2019.02); *B29C 2948/9259* (2019.02); *B29C 2948/92209* (2019.02); *B29C 2948/92514* (2019.02); *B29K 2827/18* (2013.01); *B29K 2995/0026* (2013.01); *B29K 2995/0029* (2013.01)

(58) Field of Classification Search
CPC ... B29C 64/236; B29C 64/241; B29C 64/321; B29C 64/379; B29C 48/475; B29C 48/48; B29C 48/92; B29C 48/02; B29C 48/266; B29C 64/393; B33Y 30/00; B33Y 50/02
See application file for complete search history.

(56) References Cited

U.S. PATENT DOCUMENTS

| | | | | |
|---|---|---|---|---|
| 6,129,872 | A * | 10/2000 | Jang | B29C 41/36 264/75 |
| 6,132,396 | A * | 10/2000 | Antanavich | A61B 17/00491 141/18 |
| 6,454,972 | B1 * | 9/2002 | Morisette | B29B 7/401 264/39 |
| 6,527,142 | B1 * | 3/2003 | Ikushima | B05C 5/0225 222/61 |
| 8,292,610 | B2 * | 10/2012 | Hehl | B29C 31/045 425/375 |
| 8,403,658 | B2 * | 3/2013 | Swanson | B29C 67/0055 425/190 |
| 8,915,643 | B2 * | 12/2014 | Bosiers | B29C 48/297 366/144 |
| 9,339,971 | B2 * | 5/2016 | Kraibuhler | B29C 67/0055 |
| 2007/0090568 | A1 * | 4/2007 | Teal | B33Y 30/00 264/308 |
| 2008/0070304 | A1 * | 3/2008 | Forgacs | C12N 5/0062 435/397 |
| 2009/0273122 | A1 * | 11/2009 | Batchelder | B29C 64/321 264/401 |
| 2012/0070523 | A1 * | 3/2012 | Swanson | B29C 64/106 425/96 |
| 2013/0089642 | A1 * | 4/2013 | Lipson | A23P 20/20 426/115 |
| 2013/0337101 | A1 * | 12/2013 | McGrath | A61F 2/06 425/174.8 E |
| 2014/0220168 | A1 * | 8/2014 | Perez | B29C 64/245 425/161 |
| 2014/0265040 | A1 * | 9/2014 | Batchelder | B33Y 50/02 264/409 |
| 2014/0286121 | A1 * | 9/2014 | Bosiers | B29C 48/37 366/144 |
| 2015/0096717 | A1 * | 4/2015 | Batchelder | B29C 64/40 165/64 |
| 2015/0097053 | A1 * | 4/2015 | Batchelder | B33Y 30/00 239/135 |
| 2015/0142159 | A1 * | 5/2015 | Chang | B29C 67/0007 700/119 |
| 2015/0231829 | A1 * | 8/2015 | Haider | B33Y 30/00 700/119 |

* cited by examiner

MULTI-MATERIAL EXTRUDER AND EXTRUSION METHOD FOR THREE-DIMENSIONAL (3D) PRINTING

FIELD OF THE INVENTION

The present invention relates generally to the field of three-dimensional (3D) printing, and more particularly to an extruder apparatus and method for extruding various types of materials.

BACKGROUND

In recent years, 3D printing has seen rapid growth as new processes are developed for additive manufacturing of 3D objects, whereby a 3D object of virtually any shape can be formed by adding successive layers of materials. This has allowed the development of new manufacturing processes such as rapid prototyping, and manufacturing of custom parts or replacement parts.

Common forms of additive processes include extrusion deposition, granular materials binding, lamination, and photopolymerization. With extrusion deposition, small beads of material are extruded from a nozzle to be fused to material that has already been laid down. Common types of materials used in extrusion deposition include thermoplastics and metals, typically supplied as filaments or wire that is unreeled and melted just prior to extrusion through a nozzle head. By extruding successive layers of beads of material through a nozzle under the control of one or more controller driven motors, it is possible to form articles with highly complex shapes that have heretofore not been possible, or prohibitively expensive to manufacture.

While there are now many 3D printing devices commercially available for 3D printing, the cost of the 3D printing devices has remained prohibitively high. As well, the types of materials that can be used for 3D printing has been limited by the extruder designs that have been heretofore available.

What is needed are improvements in the design of extruders and methods for use with 3D printing that can significantly reduce costs, and significantly increase the different types of materials that may be used.

SUMMARY

The present disclosure relates to a multi-material extruder and extrusion method for 3D printing, and more particularly to an apparatus and method that is adapted to extrude a wide range of materials for printing 3D structures.

In an aspect, the apparatus comprises a frame adapted to receive a removable syringe or cartridge. The syringe or cartridge is filled with material to be extruded and has a depressible piston in an extended position when the syringe or cartridge is full. The piston of the syringe or cartridge is depressed by an extruder motor mounted to the frame and having a linear actuator substantially aligned with the piston to depress the piston of the syringe or cartridge. In an embodiment, the extruder motor is under the control of an extruder logic module or component which determines how quickly and/or with how much force the piston of the syringe or cartridge is to be depressed to achieve a desired rate of extrusion of the material.

In another embodiment, the apparatus comprises an extruder motor having a shaft coupled to a threaded screw. A movable plunger gripper slidably mounted to a plurality of rods includes a threaded nut or Rampa™ insert which engages the threaded screw. Rotation of the extruder motor shaft causes rotation of the coupled threaded screw, which in turn causes the movable plunger gripper to slide along the plurality of rods. A gearbox may be used to provide sufficient torque using less expensive motors. In this embodiment, a linear actuator is replaced by the movable plunger gripper to push the plunger of the syringe or cartridge into the barrel. An end piece of the frame includes a slot adapted to receive a flange or end piece of a syringe or cartridge barrel, such that the syringe or cartridge barrel is substantially outside the frame.

A flexible length of tubing connects the tip of the syringe or cartridge to an extruder nozzle. The nozzle can be mounted to a stylus which may be hand-held, or the nozzle or stylus may be mounted to a chassis of a 3D printing device for control by the 3D printing device. In an embodiment, the chassis may be adapted to mount multiple nozzles attached to multiple lengths of flexible tubing, each of which tubing is connected at the opposite end to a syringe or cartridge driven by an extruder motor. Thus, when operated in parallel, an extruded structure may be formed more quickly than using a single nozzle, using the same extrusion materials or different materials as may be desirable.

In an embodiment, as the viscosity or flow characteristics of different types of materials that may be extruded by the apparatus may vary widely, it is desirable to provide feedback to the extruder logic module to effectively control the speed and/or force of operation of the linear actuator motor to depress the piston of the syringe or cartridge, such that the extruded material is started, flowing at a desired flow rate, or stopped altogether. For the purpose of providing the feedback, one or more sensors are placed to determine the rate of extrusion of the material, or to determine the force with which the material must be pushed to achieve a desired rate of extrusion.

In an embodiment, the one or more sensors comprises a sensor array comprising a plurality of sensors spaced apart along the length of tubing connecting the tip of the syringe or cartridge to an extrusion nozzle. As material passes through the tubing, the plurality of sensors determines the rate of extrusion of the material, and provides a feedback signal to the extruder logic module. In this manner, it is possible to effectively control the extrusion of a wide range of materials which may have different flow characteristics, and which may require significantly different speeds or forces applied by the extrusion motor to achieve a desired flow rate.

In still another embodiment, various different types and sizes of extrusion nozzles may be used in dependence upon the material to be extruded in order to achieve a desired result.

The apparatus can be used as a standalone machine when connected to a stylus, or alternatively may be connected by a circuit or an adapter to a computing device, or a 3D printing device having its own control logic. The apparatus can thus be fully programmed to automatically print 3D structures with a wide range of extruded materials.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present invention will be better understood and objects of the invention will become apparent when consideration is given to the following detailed description thereof. Such description makes reference to the annexed drawings wherein.

Figure 1:
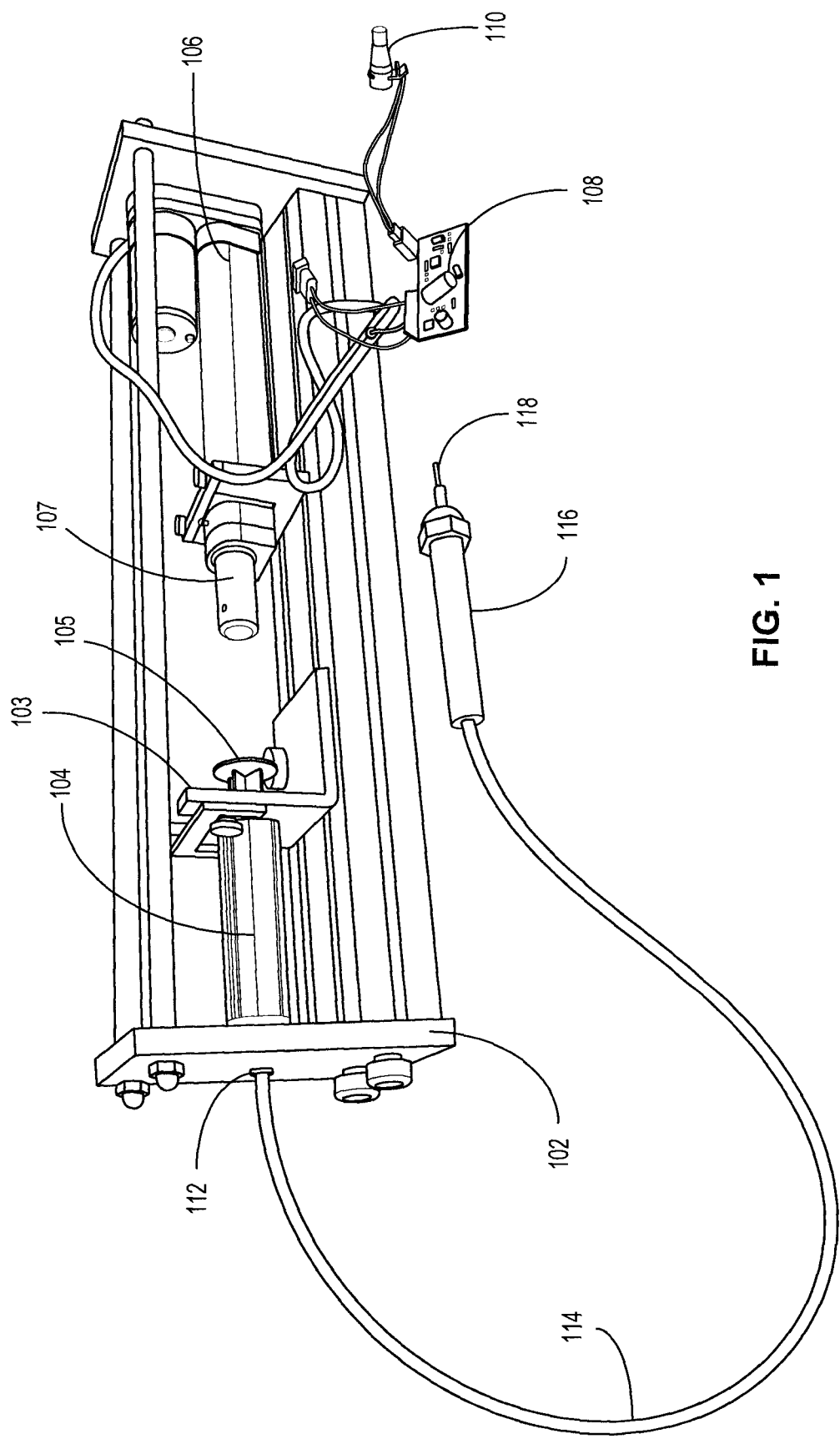
FIG. 1 shows an illustrative example of an apparatus in accordance with an embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present invention relates to an apparatus and method for extruding various types of materials for 3D printing.

Illustrative embodiments of the apparatus and method will be described in detail with reference to the figures.

Referring to FIG. 1, shown is an illustrative example of an apparatus in accordance with an embodiment. As shown, the apparatus comprises a frame 102 adapted to receive a syringe or cartridge 104 with a depressible piston 105. The syringe or cartridge 104 may be an off-the-shelf luer lock syringe type that can be securely mounted to the frame by one or more brackets 103 mounted or mountable to the frame 102. At least one bracket 103 may be adjustably mounted to receive and secure a syringe or cartridge 104 of different length. Different sizes of brackets 103 may also be used to accommodate syringes or cartridges of different diameter or size, while still centering or properly positioning the syringe or cartridge 104 in the frame 102.

A flexible length of tubing 114 is connected to the tip of the syringe or cartridge 104. The flexible length of tubing 114 may be connected, for example, by a luer lock connector 112 to secure the tip of the syringe or cartridge 104 to the length of flexible tubing 114. However, it will be appreciated that any other suitable means to connect the flexible length of tubing 114 to the syringe or cartridge 104 is possible.

The opposite end of the flexible tubing 114 is connected to a stylus 116 or mounting piece, and is provided with an extrusion nozzle tip 118. The tubing 114 material may be chosen depending on the material to be extruded, and may be, for example, food grade plastic, or tubing coated with a non-stick material such as Teflon®. Although not essential, a transparent or translucent material for the tubing 114 may be desirable such that extrusion of the material through the tubing can be visually confirmed.

Also mounted on the frame 102 is a linear actuator motor 106 controlled by a motor control circuit 108. The linear actuator motor 106 is securely mounted to the frame 102 and substantially aligned with the piston 105 of the syringe or cartridge 104 to depress the piston 105. A potentiometer 110 can be used to control the amount of force to be applied by the linear actuator motor 106 depending on the type of material to be extruded.

In operation, the syringe or cartridge 104 is pre-filled with material to be extruded, with the depressible piston 105 in an extended position. The linear actuator motor 106 is then controlled by an extruder logic module comprising a motor control circuit to depress the piston 105 of the syringe or cartridge 106 with an extendable shaft or rod 107 in order to achieve a desired rate of extrusion of the material. As will be explained in further detail below, the rate of extrusion may also be controlled by a feedback signal from one or more sensors adapted sense the rate of extrusion of material.

Figure 2:
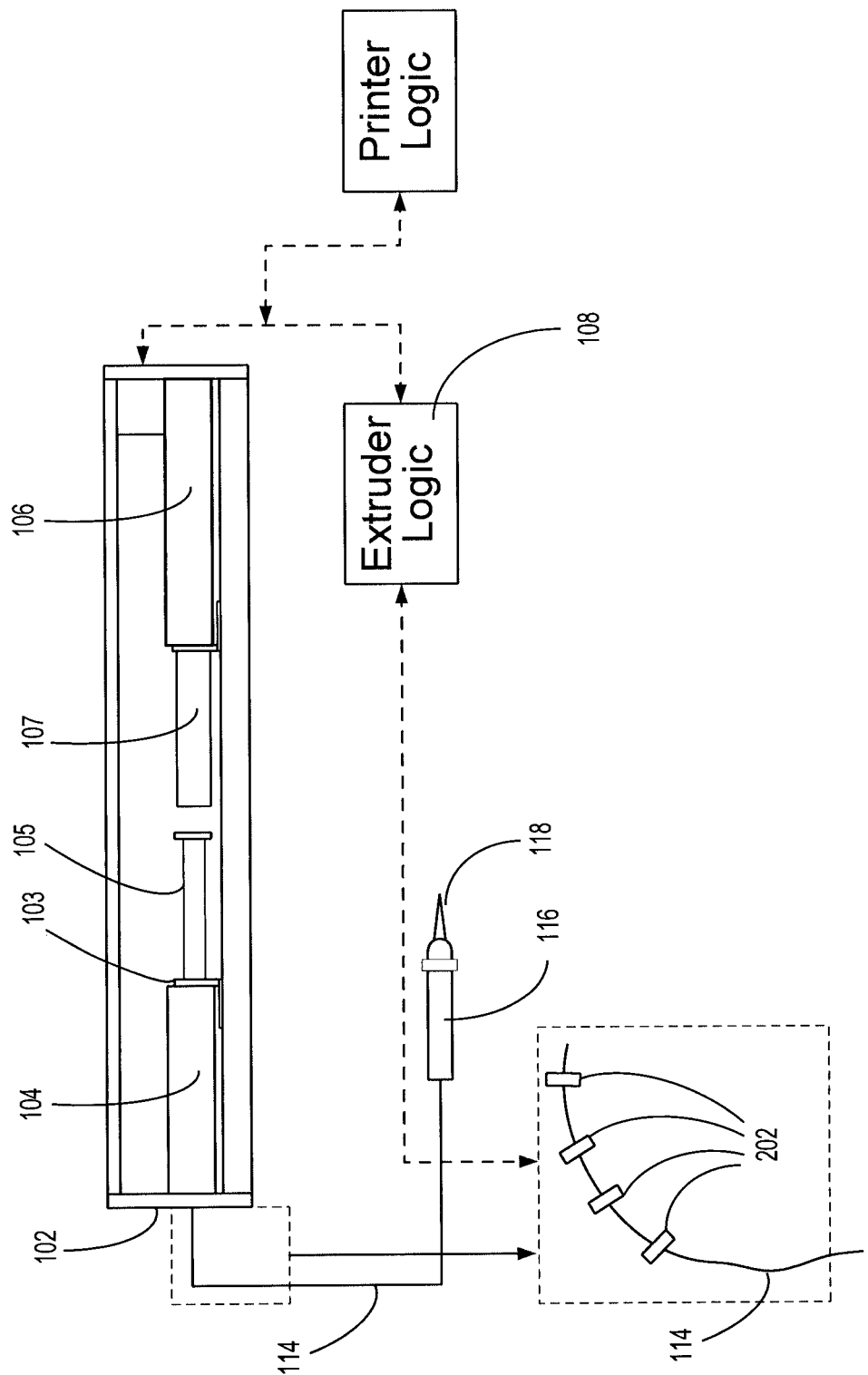
FIG. 2 shows a schematic diagram of various components of the apparatus of FIG. 1.

Now referring to FIG. 2, shown is a schematic diagram of various components of the apparatus of FIG. 1. As shown, the frame 102 securely holds a syringe or cartridge 104 with an extended, depressible piston 105 using one or more brackets 103 mounted to the frame. A linear actuation motor 106 is also mounted to the frame using mounting brackets 103, and is positioned to drive the piston 105 with an extendable shaft or rod 107 under control of extruder logic 108.

In an embodiment, as the flow characteristics of different types of materials that may be extruded by the apparatus may vary widely, it is desirable to provide feedback to the extruder logic 108 to effectively control the speed and/or force of depression of the syringe or cartridge 104 such that the flow of extruded material is started, continues at a desired flow rate, or the flow is stopped altogether. By way of example, a sensor array comprises a plurality of sensors 202 spaced apart along the length of tubing 114 connecting the tip of the syringe or cartridge 104 to an extrusion nozzle 116. The sensors 202 may be spaced along a portion, or the entire length of tubing 114 as may be required. In an embodiment, the sensors 202 may be optical sensor units incorporating a light source on one side of the tube and a light sensor on the opposite receiver side of the tube, whereby the sensor unit can sense when material has passed by. However, it will be appreciated that various other types of sensors 202 may also be used to determine when material has passed, or how quickly material is passing by.

As material passes through the tubing, the plurality of sensors 202 determines the rate of extrusion of the material, and provides a feedback signal to the extruder logic 108. Extruder Logic 108 can operate with or without a user interface, such as a monitor or a digital display and corresponding input means such as a keyboard. For example, extruder logic 108 may be built using Arduino™ or a similar mass market control circuit, or a custom circuit specifically build for the apparatus. Extruder logic 108 is configured to receive data from the sensor array 202 and calculate a viscosity estimate of paste material being extruded. The viscosity estimate calculation is then fed to a software algorithm that determines ideal extrusion parameters for driving the linear actuation motor 106 and its extendable rod 107.

In addition to the sensor array 202, one or more force sensors (such as potentiometer 110) may be located at various pressure points on one or more of the frame, the syringe or cartridge, the depressible piston, and the linear actuation motor 106 itself may also be used to determine the amount of force being applied to the syringe or cartridge 104, and to keep the linear actuation motor 106 within safe operating parameters.

Using the extrusion logic 108, the feedback system can implement changes in the parameters automatically, or alternatively allow the user to make parameter changes via interaction with a user interface. As will be described further below, the extruder logic 108 may be connected to a generic computing device 600 (FIG. 6) to provide a full range of controls over all aspects of the operation of the operation of the apparatus, and to provide the user interface and various input means.

Advantageously, the parameters required for use with various materials may be recorded by the computing device 600, such that the user can build up a library of settings to be used with different extrudable materials during subsequent use of that material. In this manner, it is possible to effectively control the linear actuation motor 108 to be used to extrude a wide range of materials which may have different flow characteristics, and which may require different forces to be applied by the extrusion motor to achieve a desired flow rate.

In an embodiment, the stylus 116 can be hand-held for printing a 3D object by hand. The nozzle tip 118 provided in the stylus 116 can be secured by a luer lock mechanism. A manual on/off button located on the stylus 116 which controls the extrusion logic 108 allows the user easy control of the flow of extruded material when printing by hand.

Figure 3:
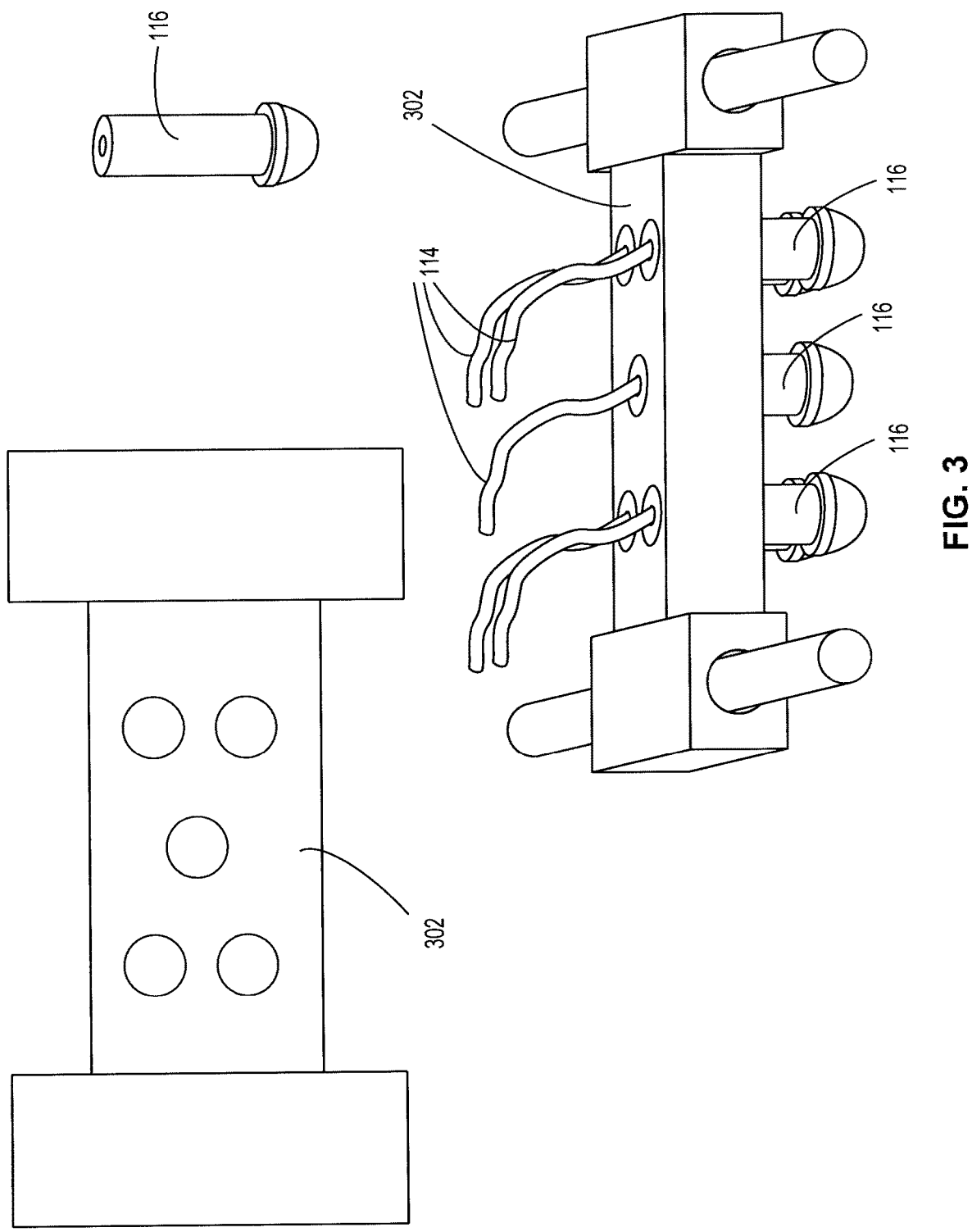
FIG. 3 shows a schematic diagram of a chassis adapted to hold a plurality of extrusion nozzles connected by flexible tubing.

While it has been shown that the apparatus can be used as a standalone machine when connected to a stylus 116, which may be handheld, the stylus 116 may also be a mounting piece mounted on a chassis 302 as shown in FIG. 3. The chassis 302 may be connected to a 3D printing device for machine control via the 3D printing device (not shown). Thus, the 3D printing device may contain its own processor and logic to control the operation of the apparatus, in addition to controlling the movement of any chassis to which the stylus is mounted, as described in more detail below.

In an embodiment, the stylus 116 attached to the end of the flexible tubing 114 is mountable on a chassis 302 having one or more mounting locations, where each mounting location can receive a stylus 116 to mount an extrusion nozzle 118. As each stylus 116 is connected via a flexible length of tubing 114, it is possible to operate a plurality of nozzles 118 in parallel using the chassis 302, such that an extruded structure may be formed more quickly than using a single nozzle 118.

Figure 4:
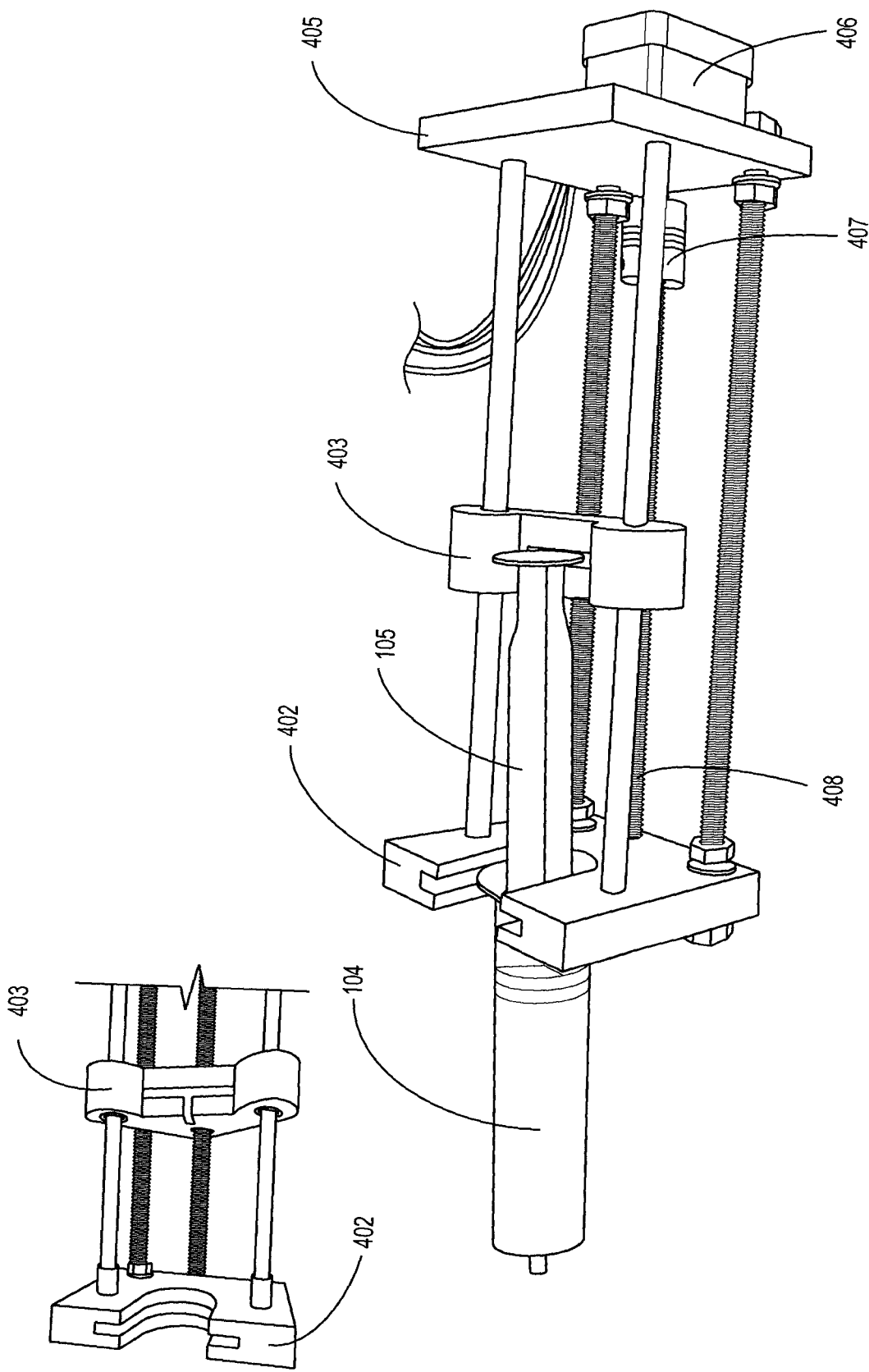
FIG. 4 shows an illustrative example of an apparatus in accordance with another embodiment.

Now referring to FIG. 4, shown is an illustrative example of an apparatus in accordance with another embodiment. In this alternative embodiment, the barrel of the syringe or cartridge 104 is extending outside the frame and only its flange or end piece is received within a slot formed in an end piece 402 of the frame. The end piece 402 of the frame and the movable plunger gripper 403 may be made of metal, or alternatively a hard plastic material to reduce weight and the build cost of the material.

In an embodiment, the end of an extending plunger 105 of the syringe or cartridge 104 is received within a movable plunger gripper 403. The movable plunger gripper 403 itself may include a slot to receive a flange provided on the end of the extending plunger 105. The movable plunger gripper 403 is slidably mounted to a plurality of metal rods positioned to provide structural support to the frame. For example, as shown in FIG. 4, four metal rods may be fastened to two end pieces of the frame, where the first end piece 402 receives the flange of the syringe or cartridge, and the second end piece 405 mounts an extrusion motor 406. The movable plunger gripper 403 may include linear bearings to guide the movable plunger gripper 403 more smoothly along the plurality of rods.

Figure 7:
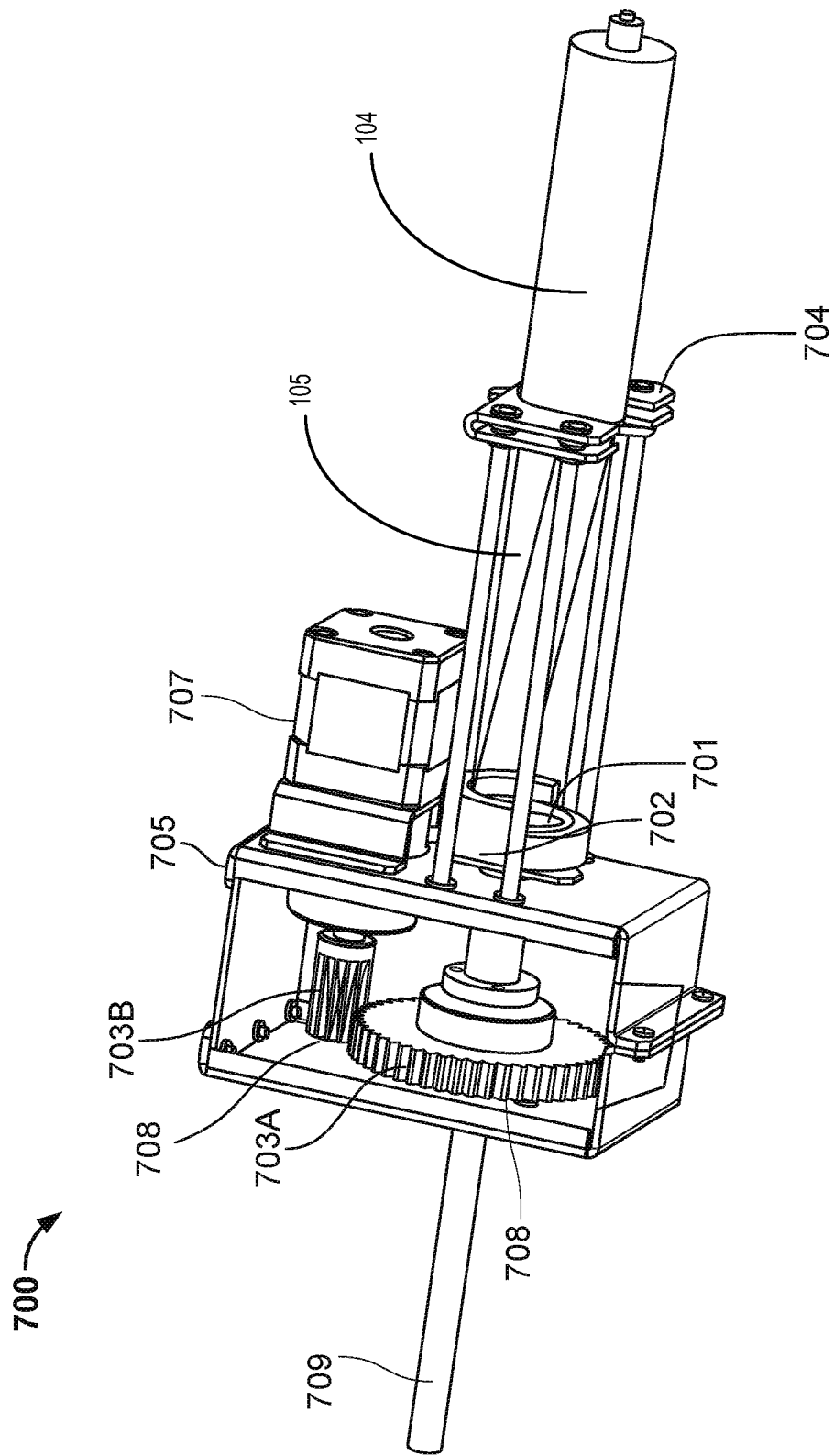
FIG. 7 shows another illustrative example of an apparatus in accordance with another embodiment.

In an embodiment, the movable plunger gripper 403 includes a threaded nut or Rampa™ insert 407 to engage and guide the movable plunger gripper 403 along the length of a threaded screw 408. The threaded screw is coupled at one end to a shaft of extruder motor 406. In an embodiment, the coupling may include a gearbox (or gearing) to generate sufficient torque using a smaller, less expensive motor than otherwise would be required for a direct drive extrusion motor. An exemplary gearbox is shown in FIG. 7.

When the extruder motor threaded screw 408 rotates in a first direction, the movable plunger gripper 403 moves towards the first end piece 402 of the frame, causing the plunger 105 to move into the barrel of the syringe or cartridge 104 and cause the material contained in the syringe or cartridge barrel 104 to be squeezed out. When the extruder motor threaded screw 408 rotates in a second, opposite direction, the movable plunger gripper 403 moves away from the first end piece 402 of the frame, and positions the movable plunger gripper 403 to receive the next syringe or cartridge filled with material with an extended plunger. Advantageously, by having the barrel of the syringe or cartridge 104 outside the frame, the frame can be made significantly smaller than the embodiment shown in FIG. 1.

Still referring to FIG. 4, in an embodiment, the apparatus may further include a barcode or chip reader positioned near the syringe or cartridge 104 to read a label on the syringe or cartridge 104. The label may provide, for example, information regarding the properties of the materials contained in the syringe or cartridge 104. This information may be used to set a motor speed suitable for the material, for example.

In another embodiment, the information provided on the barcode label or chip which provides instructions for preparing the materials prior to use. For example, the material may need to be pre-heated to a desired temperature prior to extrusion, and the information provided on the barcode label or chip may provide instructions for testing the temperature of the material prior to use, and heating the material with a heat source if necessary to a desired operating temperature. Thus, the information provided may also be used to operate one or more modules of the system.

In another embodiment, the movable plunger gripper 403 may further include a pressure sensor (e.g. potentiometer 110) to detect the back pressure applied by the material against the plunger 105. The pressure sensor may be utilized as feedback to control the extrusion motor 406 in real-time, to avoid undue pressure which may cause damage.

In yet another embodiment, the barrel of the syringe or cartridge 104 may receive a temperature sensor to detect the temperature of the material in the syringe or cartridge, which may determine how much pressure to apply to squeeze the material out.

Figure 5:
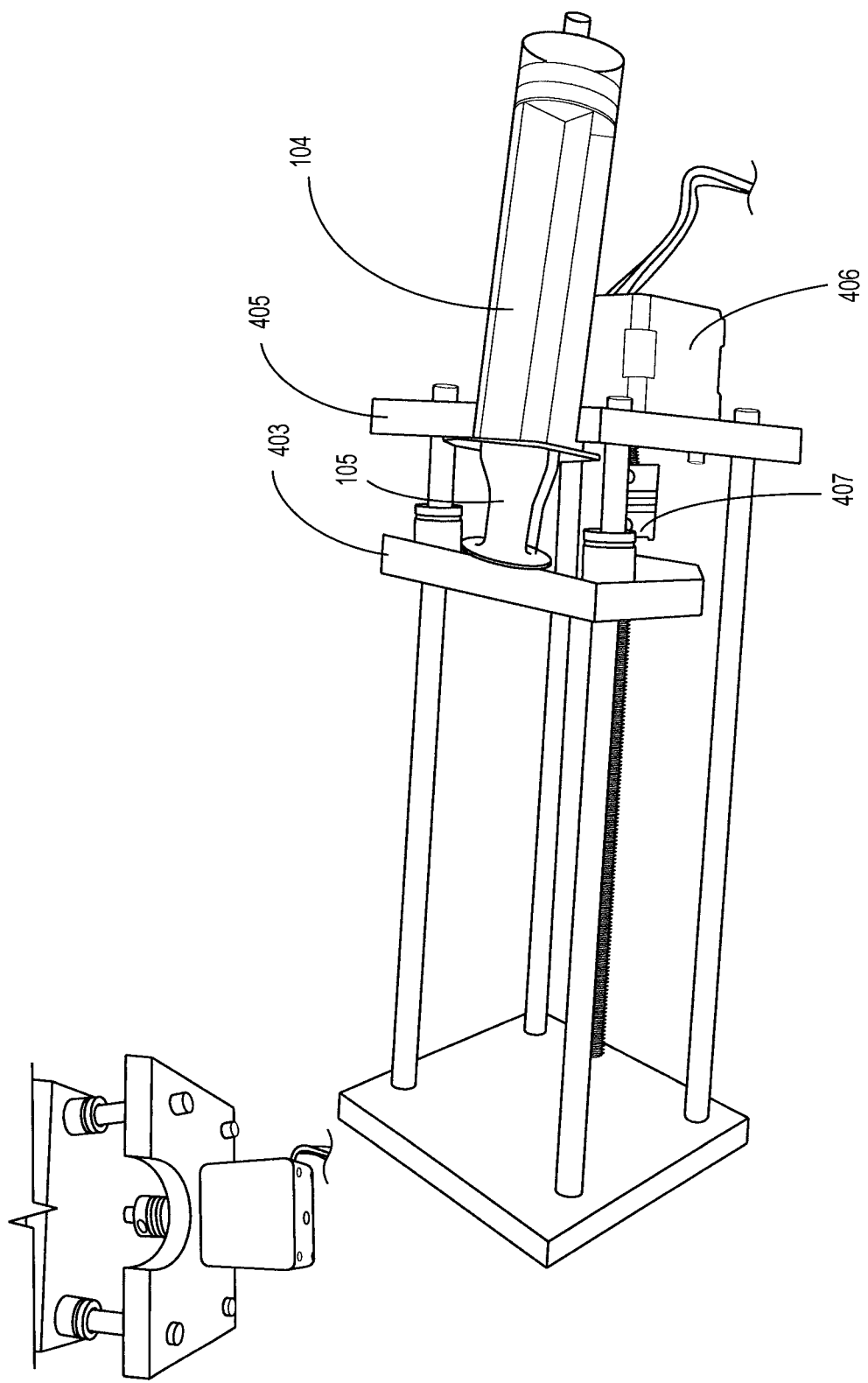
FIG. 5 shows an illustrative example of an apparatus in accordance with yet another embodiment.

Now referring to FIG. 5, shown is another illustrative embodiment in which the motor is mounted on the same end piece 405 of the frame that receives the flange of the syringe or cartridge barrel. In this case, the motor 406 is shown mounted below the syringe or cartridge barrel when it is received in the frame end piece. This alternative configuration leaves the other end piece free of any motor mounted on the outside of the frame, allowing the size of the frame to be potentially even further reduced. Other features described with reference to FIG. 4 may also be included in FIG. 5.

These alternative embodiments shown and described in FIGS. 4 and 5 may significantly lower the manufacturing cost of the paste extruder in comparison to the embodiment shown in FIG. 1. With the barrel of the syringe or cartridge extending outside the frame, the size of the extruder can be made significantly smaller than the extruder shown in FIG. 1. These alternative embodiments also show the flexibility of the design arrangement and component placement for this extruder system.

Figure 6:
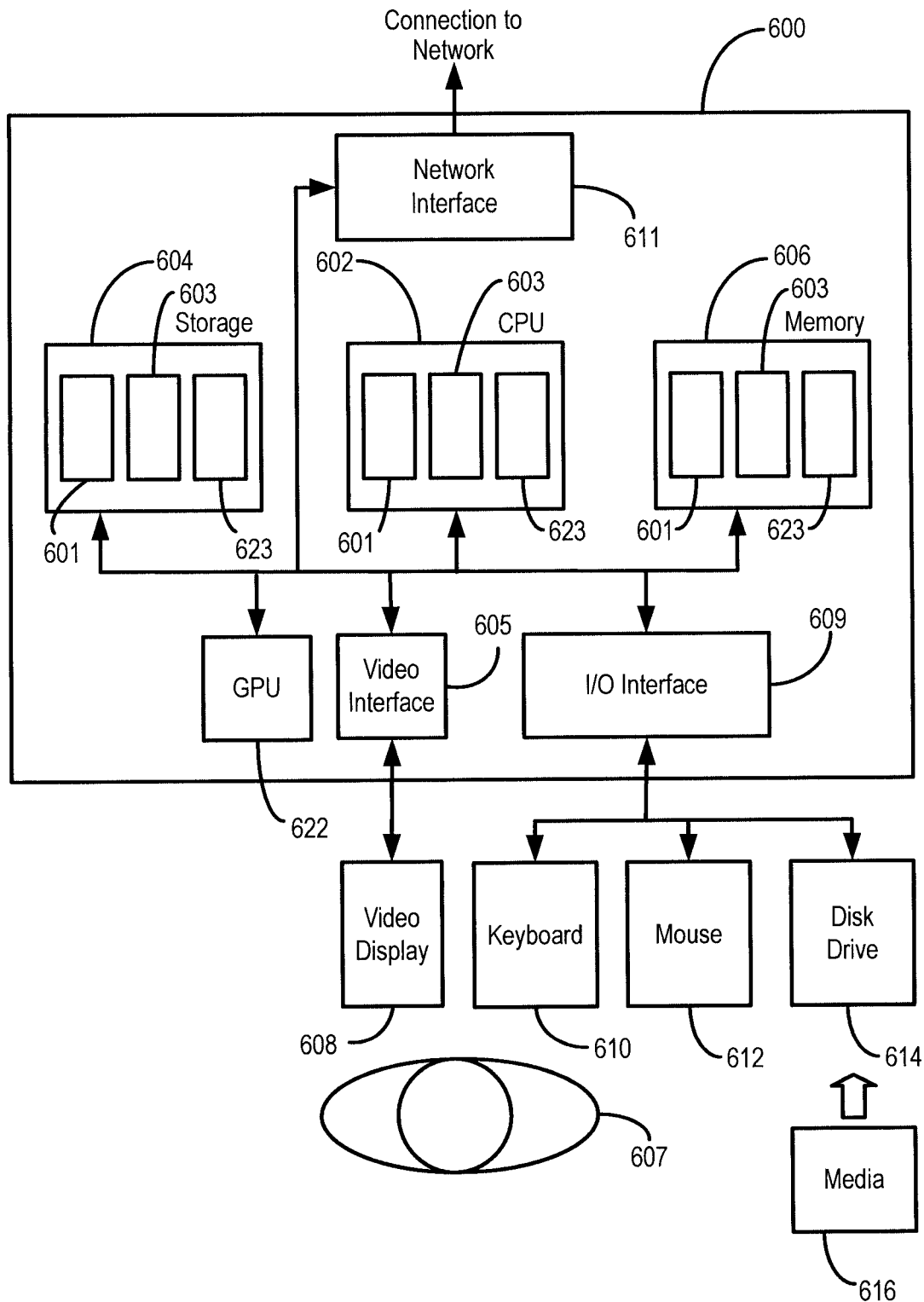
FIG. 6 shows a schematic block diagram of a generic computing device which may provide an operating embodiment in one or more embodiments.

FIG. 6 shows a schematic block diagram of a generic computing device which may be connected to the extruder logic 2) described above to provide machine control. A suitably configured computer device, and associated communications networks, devices, software and firmware may provide a platform for enabling one or more embodiments as described above. By way of example, FIG. 6 shows a generic computer device 600 that may include a central processing unit ("CPU") 602 connected to a storage unit 604 and to a random access memory 606. The CPU 602 may process an operating system 601, application program 603, and data 623. The operating system 601, application program 603, and data 623 may be stored in storage unit 604 and loaded into memory 606, as may be required. Computer device 600 may further include a graphics processing unit (GPU) 622 which is operatively connected to CPU 602 and to memory 606 to offload intensive image processing calculations from CPU 602 and run these calculations in parallel with CPU 602. An operator 607 may interact with the computer device 600 using a video display 608 connected by a video interface 605, and various input/output devices such as a keyboard 610, pointer 612, and storage 614 connected by an I/O interface 609. In known manner, the pointer 612 may be configured to control movement of a cursor or pointer icon in the video display 608, and to operate various graphical user interface (GUI) controls appearing in the video display 608. The computer device 600 may form part of a network via a network interface 611, allowing the computer device 600 to communicate with other suitably configured data processing systems or circuits, such as the extrusion logic motor circuit of the apparatus described above. One or more different types of sensors 630 connected via a sensor interface 632 may be used to search for and sense input from various sources. The sensors 630 may be built directly into the generic computer device 600, or optionally configured as an attachment or accessory to the generic computer device 600. The sensors may also be provided on the apparatus of FIGS. 1 to 3, and the feedback signal may be received by the generic computing device 600 directly, or via the extruder logic 2).

Now referring to FIG. 7, shown is another illustrative example of an apparatus 700 in accordance with another embodiment. In this example, the extruder now includes a minimal friction disk 701 positioned inside a syringe or cartridge cap at the end of the linear actuator in order to reduce possible rotational force against the syringe or cartridge plunger. A locking pin 702 may be used to connect the syringe or cartridge cap to the linear actuator.

In an embodiment, the apparatus 700 includes gearing comprising a second gear 703A and a first gear 703B. As can be seen in FIG. 7, the first gear 703B and the motor 707 are coaxial such that they rotate along a common axis of rotation defining a first axis. The second gear 703A and the linearly actuated piston are coaxial with one another, but non-coaxial with the first axis. The second gear 703A is rotationally coupled to the first gear 703B by respective gear teeth 708. In operation, the motor rotates the first gear 703B to cause rotation of the second gear 703A and to increase at the second gear 703A a torque applied to the first gear 703B. Rotation of the second gear 703B effects actuation of the linear actuator. The relative sizes of the gears may be optimized to apply an appropriate linear force against the piston 15 of the syringe or cartridge 104.

In an embodiment, a custom syringe or cartridge cradle 704 is provided, which cradle 704 is attached to support rods fixed at opposite ends to a frame 705. In order to provide sufficient strength for the apparatus, and the forces generated, the gear and motor frame 705 is preferably made of a metal. This embodiment further reduces cost and improves efficiency for production manufacturing.

Advantageously, the apparatus and method allows a wide range of materials to be extruded utilizing components that are individually relatively inexpensive to source, thereby significantly reducing costs. Furthermore, by configuring the apparatus with a flexible length of tubing, the extruded material may be applied via a hand-held stylus, or the stylus (or mounting piece) may be mounted to a chassis for control via a 3D printing device. The configuration of multiple extrusion devices is also made possible via the flexible lengths of tubing and a chassis that my mount multiple mounting pieces at the same time.

Thus, in an aspect, there is provided apparatus for extruding materials for three-dimensional printing, comprising: a frame adapted to receive and hold a syringe or cartridge, the syringe or cartridge containing extrudable material and having a depressible piston; an extruder motor for depressing the piston of the syringe or cartridge under control of an extruder logic component; and a flexible length of tubing connectable to a tip of the syringe or cartridge received in the frame, an opposite end of the tubing mountable to an extrusion nozzle for extruding the extrudable material for three-dimensional printing.

In an embodiment, the apparatus further comprises one or more sensors for sensing a rate of extrusion of the extrudable material through the flexible length of tubing, the one or more sensors adapted to transmit a feedback signal to the extruder logic component.

In another embodiment, the one or more sensors comprises a sensor array spaced apart along the length of tubing connecting the tip of the syringe or cartridge to the extrusion nozzle.

In another embodiment, the one or more sensors comprises force sensors located at pressure points on one or more of the frame, the syringe or cartridge, the depressible piston, and the linear actuation motor.

In another embodiment, the extruder logic is configured to receive data from the sensor array and calculate a viscosity estimate of paste material being extruded.

In another embodiment, the extruder logic is configured to execute a software algorithm receiving the viscosity estimate to determine extrusion parameters for driving the linear actuation motor.

In another embodiment, the extrusion logic can utilize the feedback signal to implement changes in the apparatus parameters automatically.

In another embodiment, the extrusion logic can utilize the feedback signal to calculate possible changes in the apparatus parameters, and display these parameter changes on a user interface for confirmation via a user input.

In another embodiment, the apparatus further comprises a memory for recording the parameters required for use with various materials, such that the extrusion logic can build up a library of settings to be used with different extrudable materials during subsequent extrusion of the materials.

In another embodiment, the extrusion nozzle is mountable to a chassis by means of a mounting piece, the chassis adapted to be mounted to and controlled by a three-dimensional printing device.

In another embodiment, the apparatus is adapted to receive a syringe or cartridge having a machine readable label including information on the type of material in the syringe or cartridge, and one or more extrusion parameters to be used to extrude the material in the syringe or cartridge.

In another aspect, there is provided a method for extruding materials for three-dimensional printing, comprising: providing a frame adapted to receive and hold a syringe or cartridge, the syringe or cartridge containing extrudable material and having a depressible piston; providing an extruder motor for depressing the piston of the syringe or cartridge under control of an extruder logic component; and extruding the extrudable material for three-dimensional printing through a flexible length of tubing connected at one end to a tip of the syringe or cartridge received in the frame, and at an opposite end to an extrusion nozzle.

In an embodiment, the method further comprises sensing a rate of extrusion of the extrudable material through the flexible length of tubing, and transmitting a feedback signal to the extruder logic component for control of the extruder motor.

In another embodiment, the one or more sensors comprises a sensor array spaced apart along the length of tubing connecting the tip of the syringe or cartridge to the extrusion nozzle.

In another embodiment, the one or more sensors comprises force sensors located at pressure points on one or more of the frame, the syringe or cartridge, the depressible piston, and the linear actuation motor.

In another embodiment, the method further comprises configuring the extruder logic to receive data from the sensor array and calculate a viscosity estimate of paste material being extruded.

In another embodiment, the method further comprises configuring the extruder logic to execute a software algorithm receiving the viscosity estimate to determine extrusion parameters for driving the linear actuation motor.

In another embodiment, the method further comprises configuring the extrusion logic utilize the feedback signal to implement changes in the apparatus parameters automatically.

In another embodiment, the method further comprises configuring the extrusion logic to utilize the feedback signal to calculate possible changes in the apparatus parameters, and display these parameter changes on a user interface for confirmation via a user input.

In another embodiment, the method further comprises providing a memory for recording the parameters required for use with various materials, such that the extrusion logic can build up a library of settings to be used with different extrudable materials during subsequent extrusion of the materials.

In another embodiment, the method further comprises mounting the extrusion nozzle to a chassis by means of a mounting piece, the chassis adapted to be mounted to and controlled by a three-dimensional printing device.

In another embodiment, the method further comprises receiving a syringe or cartridge having a machine readable label including information on the type of material in the syringe or cartridge, and one or more extrusion parameters to be used to extrude the material in the syringe or cartridge.

While illustrative embodiments have been described above by way of example, it will be appreciated that various changes and modifications may be made without departing from the scope of the invention, which is defined by the following claims.

The invention claimed is:

1. An apparatus for extruding materials for three-dimensional printing, comprising:
   a frame adapted to receive and hold a removable syringe, the syringe having a barrel containing extrudable material and having a piston depressible within the barrel;
   a gearing having at least a first gear and a second gear rotating on different axes and rotationally coupled to one another to increase at the second gear a torque applied to the first gear;
   an extruder motor under control of an extruder logic component, the extruder motor coupled to the first gear to rotate the first gear to cause the second gear to rotate to a linear actuator to depress the piston of the syringe, the linear actuator coupled to the second gear and being disposed non-coaxially with the extruder motor; a plunger gripper coupled to the linear actuator, the plunger gripper adapted to have the piston removably mounted thereon, the linear actuator causing relative movement between the piston and the barrel for extruding the extrudable material; and
   a flexible length of tubing connectable to a tip of the syringe received in the frame, an opposite end of the tubing mountable to an extrusion nozzle for extruding the extrudable material for three-dimensional printing.

2. The apparatus of claim 1, further comprising one or more sensors for sensing a rate of extrusion of the extrudable material through the flexible length of tubing, the one or more sensors adapted to transmit a feedback signal to the extruder logic component.

3. The apparatus of claim 2, wherein the one or more sensors comprises a sensor array spaced apart along the length of tubing connecting the tip of the syringe to the extrusion nozzle.

4. The apparatus of claim 2, wherein the one or more sensors comprises force sensors located at pressure points on one or more of the frame, the syringe, the depressible piston, and the extruder motor.

5. The apparatus of claim 3, wherein the extruder logic component is configured to receive data from the sensor array and calculate a viscosity estimate of paste material being extruded.

6. The apparatus of claim 5, wherein the extruder logic component is configured to execute a software algorithm receiving the viscosity estimate to determine extrusion parameters for driving the linear actuation motor.

7. The apparatus of claim 6, wherein the extruder logic component can utilize the feedback signal to implement changes in the extrusion parameters automatically.

8. The apparatus of claim 6, wherein the extruder logic component can utilize the feedback signal to calculate changes in the extrusion parameters, and display the changes on a user interface for confirmation via a user input.

9. The apparatus of claim 7, further comprising a memory for recording the extrusion parameters required for use with various materials, such that the extruder logic component can build up a library of settings to be used with different extrudable materials during subsequent extrusion of the materials.

10. The apparatus of claim 1, wherein the extrusion nozzle is mountable to a chassis by means of a mounting piece, the chassis adapted to be mounted to and controlled by a three-dimensional printing device.

11. The apparatus of claim 1, wherein the syringe has a machine readable label including information on the extrudable material in the syringe, and one or more extrusion parameters to be used to extrude the material in the syringe.

12. The apparatus of claim 4, wherein the extruder logic component is configured to receive data from the sensor array and calculate a viscosity estimate of paste material being extruded.

13. The apparatus of claim 12, wherein the extruder logic component is configured to execute a software algorithm receiving the viscosity estimate to determine extrusion parameters for driving the extruder motor.

14. The apparatus of claim 8, further comprising a memory for recording the extrusion parameters required for use with various materials, such that the extruder logic component can build up a library of settings to be used with different extrudable materials during subsequent extrusion of the materials.

15. The apparatus of claim 1, further comprising one or more sensors including at least one flow rate sensor for sensing a rate of extrusion of the extrudable material through the flexible length of tubing, the one or more sensors adapted to transmit a feedback signal to the extruder logic component to adjust the rate of extrusion.

16. The apparatus of claim 1, wherein the frame comprises one or more brackets for receiving and holding the syringe, at least one of the one or more brackets adjustable along the frame to receive and hold syringes of varying lengths.

17. The apparatus of claim 1, wherein the plunger gripper is slidably mounted to a plurality of rods mounted to the frame.

18. The apparatus of claim 1, wherein the plunger gripper further comprises a threaded nut and the linear actuator comprises a threaded screw engaged to the threaded nut wherein relative rotation between the threaded screw and the threaded nut causes linear movement of the plunger gripper.

* * * * *